United States Patent

Fischer

[11] Patent Number: 5,098,236
[45] Date of Patent: Mar. 24, 1992

[54] ARRANGEMENT FOR BRACING A LOAD

[75] Inventor: Manfred Fischer, Ottobrunn, Fed. Rep. of Germany

[73] Assignee: Messerschmitt-Bolkow-Blohm GmbH, Fed. Rep. of Germany

[21] Appl. No.: 622,792

[22] Filed: Dec. 5, 1990

[30] Foreign Application Priority Data

Dec. 14, 1989 [DE] Fed. Rep. of Germany ....... 3941294

[51] Int. Cl.$^5$ .............................................. B64D 1/02
[52] U.S. Cl. .................................... 410/77; 244/137.4;
294/82.26; 294/103.1; 89/1.51; 89/1.806;
89/1.819
[58] Field of Search ................. 410/2, 47, 77, 80, 84,
410/94, 156; 244/137.4; 294/82.26, 102.1,
103.1; 89/1.51, 1.58, 1.806, 1.819

[56] References Cited

U.S. PATENT DOCUMENTS

| 3,011,405 | 12/1961 | Moss et al. | 89/1.819 X |
| 3,268,188 | 8/1966 | Roe et al. | 244/137.4 X |
| 3,504,406 | 4/1970 | Schott | 294/82.26 X |
| 3,854,680 | 12/1974 | Hasquenoph et al. | 244/137.4 X |
| 3,854,681 | 12/1974 | Hasquenoph et al. | 244/137.4 X |
| 3,942,749 | 3/1976 | Hasquenoph et al. | 244/137.4 |
| 4,236,853 | 12/1980 | Niggemeier et al. | 410/77 X |

FOREIGN PATENT DOCUMENTS

| 2731103 | 1/1978 | Fed. Rep. of Germany | 244/137.4 |
| 2835607 | 5/1979 | Fed. Rep. of Germany | 244/137.4 |
| 2580736 | 10/1986 | France | 244/137.4 |

Primary Examiner—Robert J. Spar
Assistant Examiner—William M. Heinz
Attorney, Agent, or Firm—Evenson, Wands, Edwards, Lenahan & McKeown

[57] ABSTRACT

An arrangement for bracing a load in which a wedge is moved into frictional engagement between a mounting surface and a surface of the load. A spring biased rod is coupled to the wedge and moves it into and out of engagement with the mounting and load surfaces. A stop is provided to prevent the wedge from penetrating between said surfaces beyond a predetermined limit in order to avoid generating excessive forces between said surfaces.

3 Claims, 3 Drawing Sheets

ARRANGEMENT FOR BRACING A LOAD

BACKGROUND AND SUMMARY OF THE INVENTION

The present invention relates to an arrangement for bracing a load which is slidably mounted on a guide rail.

An arrangement of this generic type is disclosed in U.S. Pat. No. 3,268,188 in which a bomb or other load is suspended under an airplane by means of brackets and a double-hook arrangement, the wedge bracing the brackets against the hooks by means of a wedge clamping. Clamping is achieved by means of a lifting rod which is subjected to a spring pressure. In this arrangement, however, it is possible for the wedge to jam in its bearing, thereby impairing the release of the load.

It is an object of the present invention to provide a wedge clamping arrangement of the generic type in which the wedge cannot be pressed farther into the groove even by vibration or other influences.

This object is achieved by providing a mechanical stop which limits the penetration of the wedge into the wedge groove so that an indeterminately large force, and possible cold welding, are prevented between the wedge surfaces.

Other objects, advantages and novel features of the present invention will become apparent from the following detailed description of the invention when considered in conjunction with the accompanying drawings.

BRIEF DESCRIPTION OF THE DRAWINGS

FIG. 1b is a detail of the arrangement according to FIGS. 1, 1a;

DETAILED DESCRIPTION OF THE DRAWING

Figure 1A:
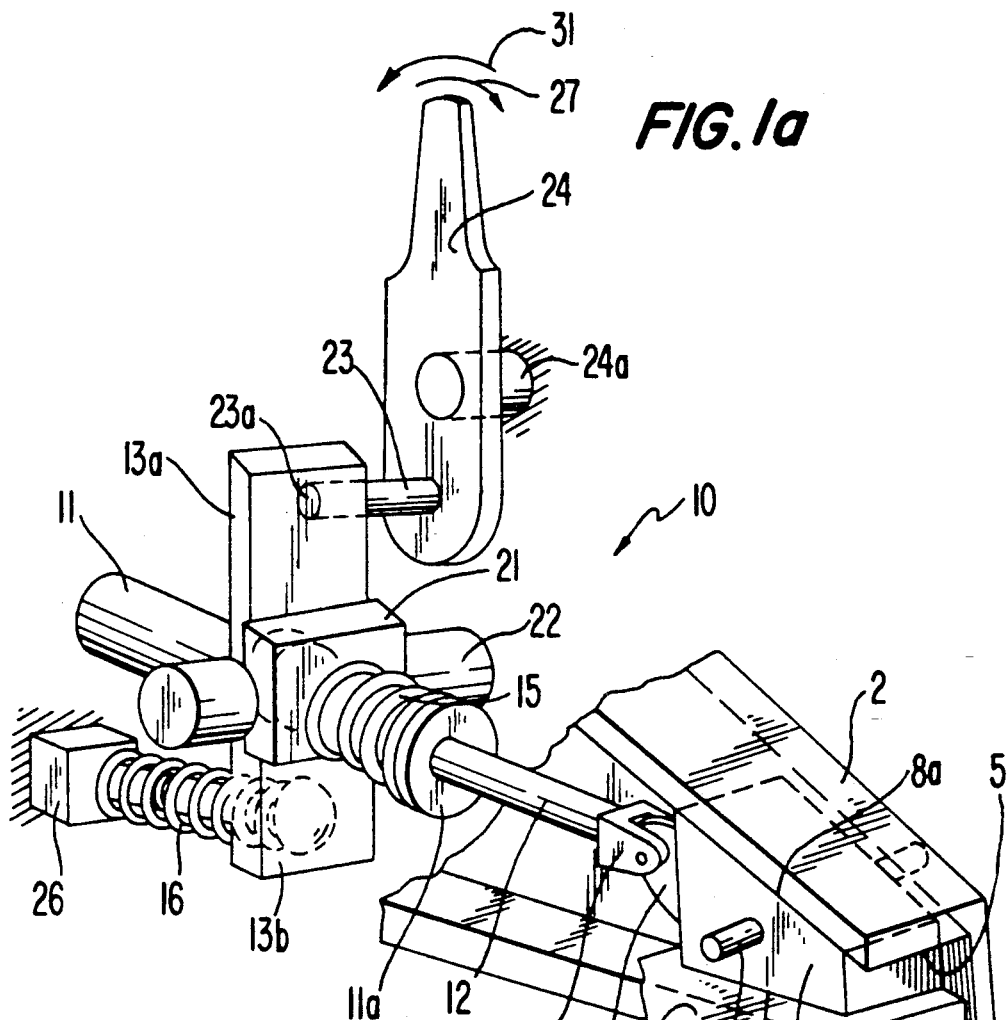
FIG. 1a is a perspective representation of the arrangement according to FIG. 1.
Figure 1B:
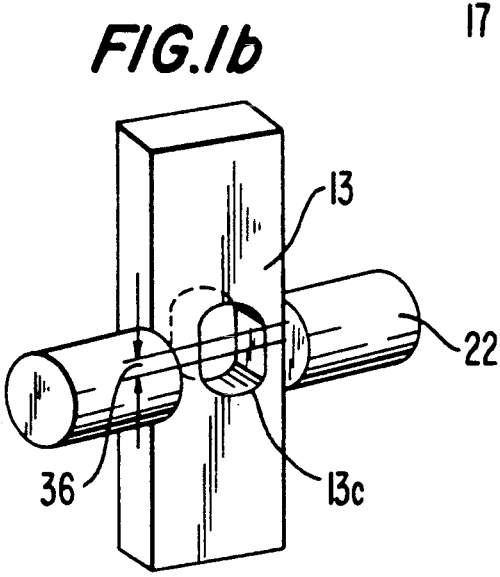
Figure 1:
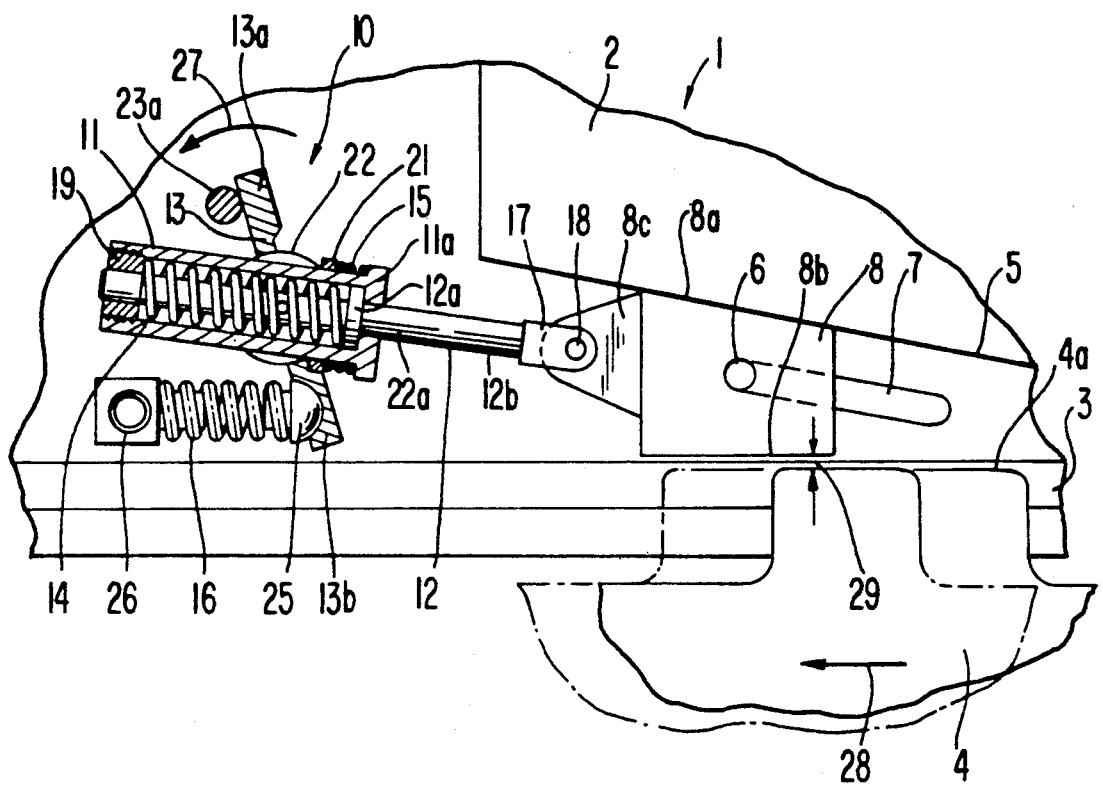
FIG. 1 illustrates an arrangement for bracing a load according to the invention as it is positioned while the load is being introduced into the arrangement.

Referring to FIGS. 1 and 1a, a bracing arrangement 1 is enclosed by a housing 2 which has a guide rail 3. The arrangement 1 may, for example, be installed into the bottom side of a fuselage (not shown), the guide rail 3 projecting out of the bottom side of the fuselage. A load 4, such as a missile, has been moved into the guide rail 3. Inside the housing 2, an oblique surface 5 serves as a sliding surface for a wedge 8, which is guided in grooves 7 of the housing 2 by means of a pin 6 (see FIG. 1a). The wedge 8 has an oblique surface 8a which has a slope similar to that of surface 5, and rests against it and against a surface 8b which interacts with the upper edge surface 4a of the load 4. The wedge 8 also has a lug 8c. A clamping system 10 arranged in the housing 2 interacts with the wedge 8. This clamping system 10 comprises essentially a cylinder 11 slidably disposed in a ring 21 which is fixedly disposed relative to the housing 2, a lifting rod 12, a clamping rocker 13, a first spring 14, a second spring 15 and a third spring 16. The lifting rod 12 is slidably disposed in the cylinder 11, its longitudinal movement being bounded by a collar 12a; its free end, which projects out of the cylinder 11, is provided with a fork head 17 connected with the lug 8c of the wedge 8 by means of a pin 18. On one end, the cylinder 11 is closed off by a threaded plug 19 which serves as the bearing for the lifting rod 12 and, on the other end, the cylinder 11 is closed off by a flange 11a.

Figure 2:
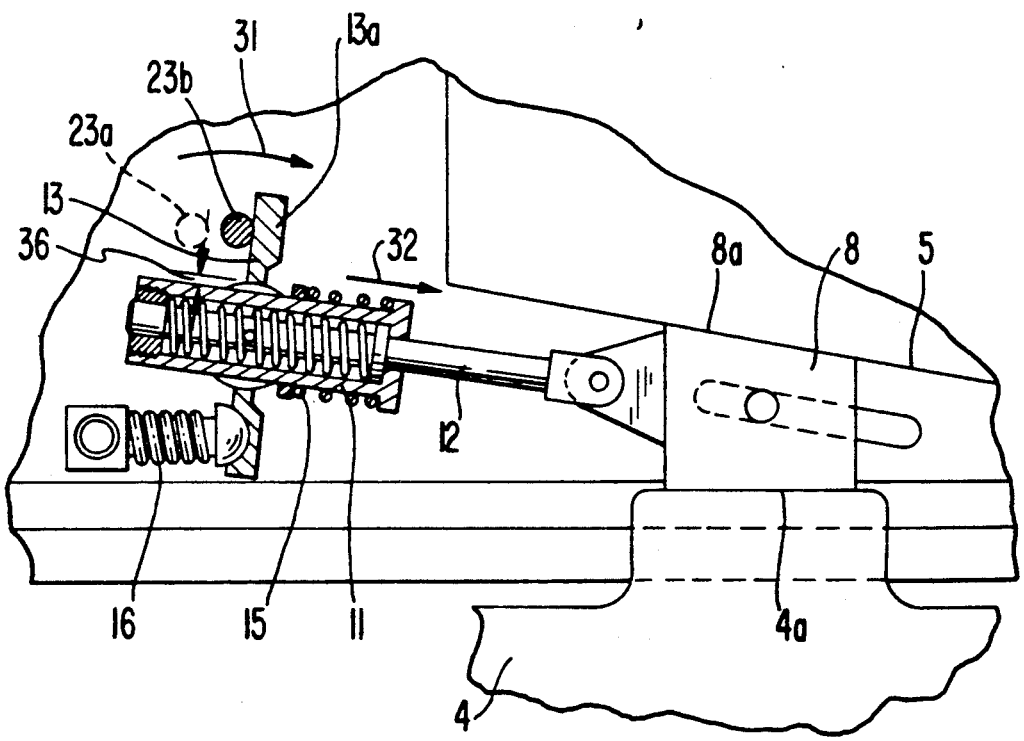
FIG. 2 is the arrangement corresponding to FIG. 1 after the bracing of the load.
Figure 3:
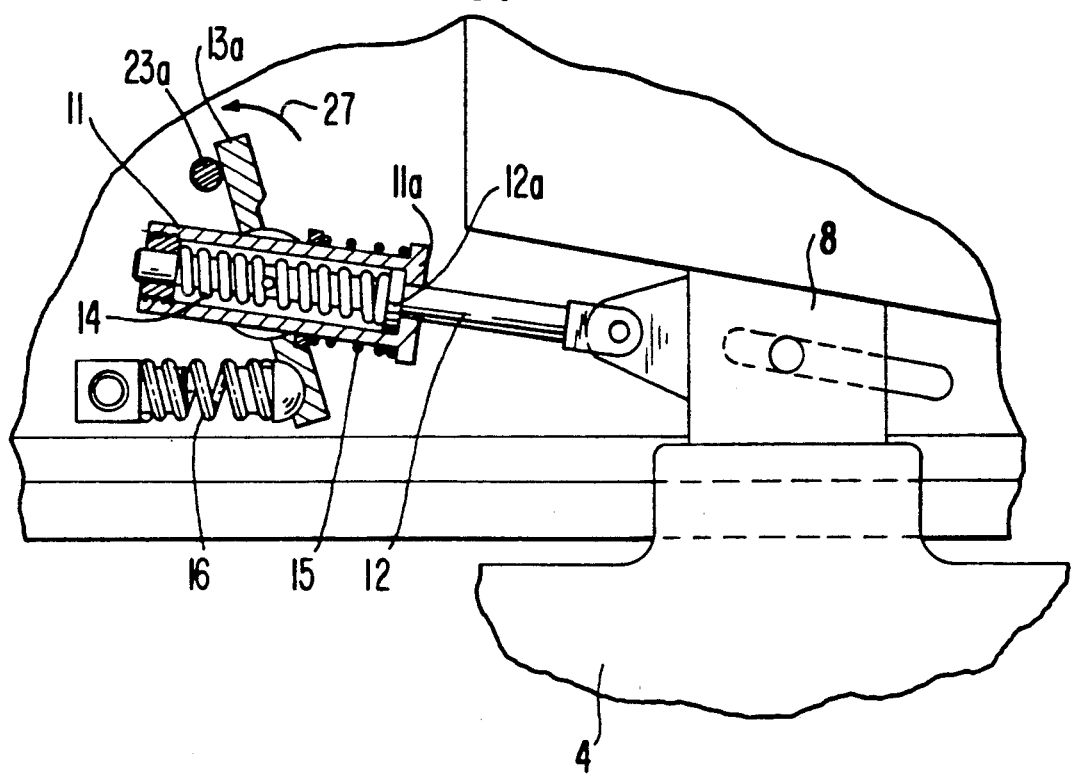
FIG. 3 is the arrangement corresponding to FIG. 1 before the release of the load.
Figure 4:
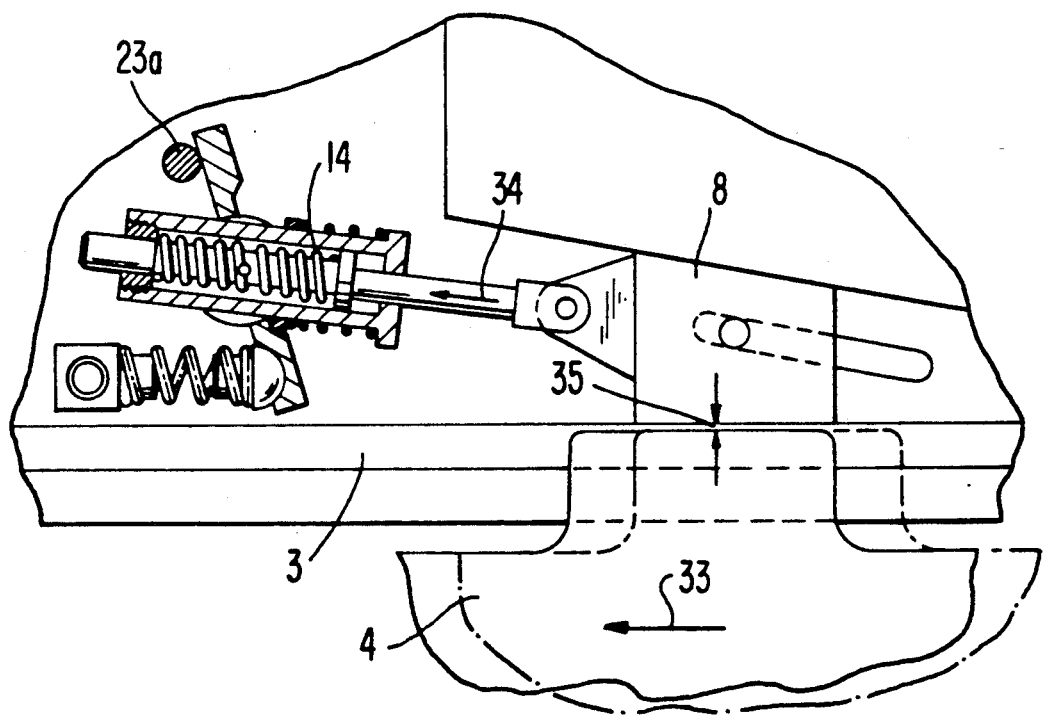
FIG. 4 is the arrangement corresponding to FIG. 1 during the release of the load.

The clamping rocker 13 has an oblong bore 13c (see FIG. 1b and 2) which, in the longitudinal direction of the lever, is longer than in its width by twice the amount 36. When the clamping rocker 13 is placed in an oblique position as shown in FIGS. 1, 3 and 4, the force of the spring 16, causes the clamping rocker 13 to clamp and hold the cylinder 11, preventing it from sliding in ring 21 in the direction of the axis of lifting rod 12. Between the interior wall of the cylinder 11 and the lifting rod 12, the first spring 14 is installed in a compressed state so that the collar 12a of lifting rod 12 is firmly biased against the cylinder flange 11a. The second spring 15 is installed on the outside of the cylinder 11, between the cylinder flange 11a and ring 21 which is used as the abutment for the spring 15. The maximum force exerted by the second spring 15 must be smaller than that of the first spring 14.

As shown in FIG. 1b, the clamping rocker 13 is provided with two bearing journals 22 which can be rotated around the pivot 22a in the housing 2 (FIG. 1), the pivot being situated on the axis 12b of the lifting rod 12. A lever 24 is provided with a pin 23 and is disposed rotatably around an axle piece 24a fixed to the housing (see FIG. 1a). The lever 24 may be rotated and locked between two positions. In the first position, it lets the clamping rocker 13 clamp freely on cylinder 11 by way of spring 16. In the second position, the lever 24 presses against the clamping rocker 13, and in the process eliminates the clamping force against the cylinder 11 which, is therefore free to move in the direction of an arrow 32 under the force of spring 15. The lower arm 13b rests against a spherical shell 25 which, together with bracket 26 fixed to the housing, serves as the bearing for the third spring 16. The third spring 16 must be designed such that a secure clamping is ensured between the clamping rocker 13 and the cylinder 11.

The operating sequence of the arrangement 1 is as follows. FIG. 1 illustrates the installed position of the arrangement 1, the clamping rocker 13, in the first position of the lever 24, taking up the shown position. In this case, the cylinder 11 and the wedge 8 take up the shown position in which the second spring 15 is compressed. With this starting position, the load 4 is moved into the guide rail 3 in the direction of an arrow 28 and is advanced into the position indicated by an interrupted line, a gap 29 remaining between the lower wedge surface 8a and the upper load surface 4a. In this position, the load 4 is fixed in a manner which is not shown. To brace the load 4 in this position, corresponding to FIG. 2, the lever 24 is moved in the direction of arrow 31 (see FIG. 1a). As a result, the pin 23 is moved in the opposite direction from stop point 23a to point 23b, the clamping rocker 13 is rotated (see FIG. 2) and the spring 16 is compressed. In the process, the cylinder 11, the lifting rod 12 and the wedge 8 are pressed by the second spring 15 in the direction of an arrow 32, whereby the wedge 8, without play, reaches a stop between the housing surface 5 and the load surface 4a. For the play-free clamping of the wedge 8, as shown in FIG. 3, the lever 24 and therefore the pin 23 are pressed back into the initial position corresponding to an arrow 27, in which case the clamping rocker 13, by means of the spring 16, again clamps and holds the cylinder 11. In this case, the cylinder 11 is also held back in its present position by means of the second spring 15. The biasing force of the first spring 14 holds the wedge 8 in its position without play. However, if the wedge groove (the clearance between surfaces 8a and 4a) is widened by means of vibrations, etc., the latter cannot penetrate any deeper because the collar 12a of the lifting rod 12 rests against the flange 11a of the cylinder 11. When the load 4 is released from its fixing points, and, for example, in the case of a missile, is pushed by its own thrust in the direction of an arrow 33 on the guide rail 3, frictional forces between surface 8b of the wedge and surface 4a of the load cause the wedge 8 to move in the direction of an arrow 34 against the force of the first spring 14, until a small gap 35 is created between the wedge 8 and the load 4, and the latter can leave the guide rail 3 unhindered. The interrupted line of the load 4 illustrated the fixed position corresponding to FIGS. 2 and 3.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. An arrangement for bracing a load relative to a mounting surface comprising a wedge having a first surface adapted to frictionally engage with said mounting surface and having a second surface adapted to frictionally engage with a surface of the load in such manner as to be wedged between said mounting surface and said surface of said load said wedge being movable in a guide into and out of engagement with said mounting surface and said surface of said load, a lifting rod coupled to said wedge, said lifting rod being slidingly disposed in a displaceable cylinder, the inside diameter of which is larger than the diameter of the lifting rod, whereby an annular cavity is formed between the lifting rod and said cylinder, a first spring compressed in said annular cavity between a collar fixedly arranged on the lifting rod and a cylinder flange fixedly arranged at an end of said cylinder nearest said wedge, a second spring arranged outside and around said cylinder between said cylinder flange and a ring which is fixedly disposed relative to said mounting surface, a pivotable double lever which is fixedly disposed relative to said mounting surface, has a pivot which is disposed on the cylinder axis and can be locked in two positions by means of an upper arm thereof, a third spring which is fixedly disposed relative to said mounting surface and presses against a lower arm of the double lever, said double lever being adapted in one position to clamp the cylinder in an indisplaceable manner, and to displaceably release the cylinder in the other position.

2. An arrangement according to claim 1, wherein the force exerted by the second spring is weaker than the force exerted by the first spring.

3. An arrangement according to claim 1, wherein the force exerted by the third spring is sufficient to hold the double lever and the cylinder in their respective positions.

* * * * *